April 21, 1925.  E. HAUSER  1,534,448
OIL CONTAINER FOR ELECTRIC APPARATUS
Filed Aug. 11, 1921
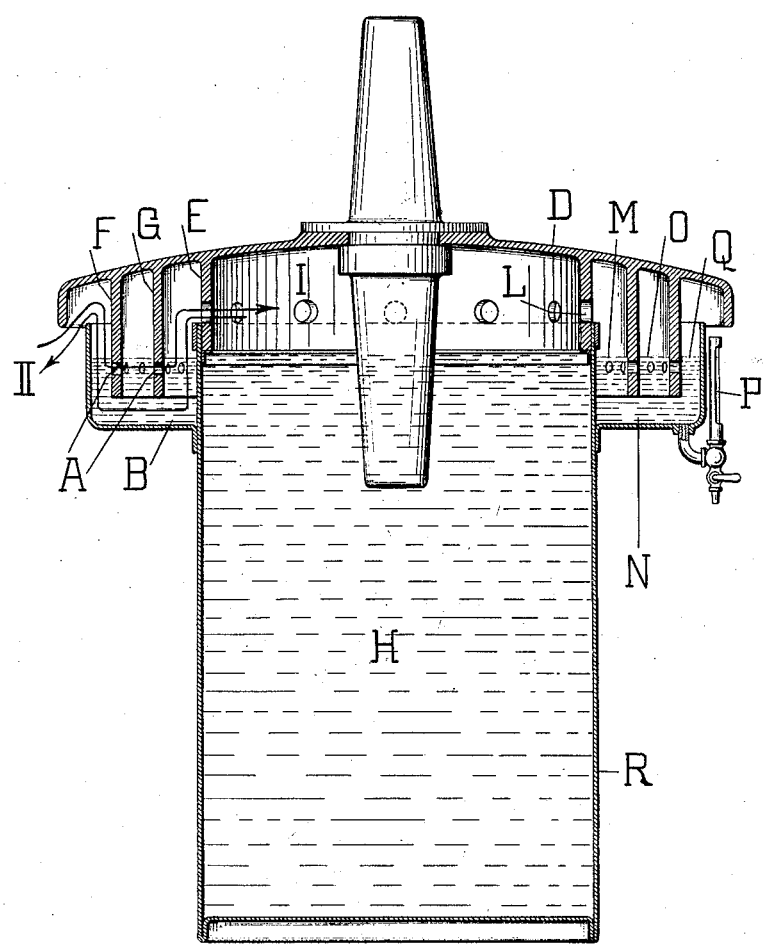
Inventor:
Ernst Hauser,
By
Atty Patented Apr. 21, 1925.

1,534,448

UNITED STATES PATENT OFFICE.

ERNST HAUSER, OF SCHAFFHAUSEN, SWITZERLAND.

OIL CONTAINER FOR ELECTRIC APPARATUS.

Application filed August 11, 1921. Serial No. 491,460.

*To all whom it may concern:*

Be it known that I, ERNST HAUSER, a citizen of the Republic of Switzerland, residing at Schaffhausen, Switzerland, have invented certain new and useful Improvements in Oil Containers for Electric Apparatus; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in oil containers for electric apparatus and particularly to a seal interposed between the oil container for the electric apparatus and its cover.

With electric apparatus such as transformers provided with oil insulation the tank which contains the oil and the transformer is generally closed in its top part by a cover. Between said cover and the oil inside the tank an air space is present which, as a rule, is not hermetically sealed against the outer atmosphere. The content of that space varies in accordance with the temperature of the whole apparatus and especially with the variation of the volume of the oil. When the temperature of the apparatus drops, the size of the air space increases and fresh air from the outside enters said space, and, vice versa, air flows in the opposite direction when the temperature of the apparatus increases and the air space becomes smaller. Even a rise or fall of the temperature of the surrounding air causes already a flow of the air in the aforementioned manner. The discharge of air from the air space is not disadvantageous to the apparatus, but the entrance of the air into said space proves harmful. The entering air contains as a rule moisture which is condensed inside the tank and mixes with the oil. On account of its specific gravity the condensed water sinks through the oil to the bottom of the tank. When the water sinks to the bottom it gets into contact with the metal parts and the insulating parts of the apparatus submerged in the oil and has a detrimental effect on the insulating parts and on the insulating property of the oil which is very much reduced already with small quantities of water admixed to it; the factor of safety of the whole apparatus which especially with oil-break switches having to deal with large powers is of utmost importance, is thereby reduced.

The object of the present invention is a seal for oil tanks of electric apparatus and provided with a cover, by which seal the above mentioned draw-backs are overcome. According to the invention the oil tank is provided with an air filter at the point between tank and cover, which air filter is so arranged that the air flowing into the space of the tank between the oil level and the cover has to pass a substance absorbing the moisture so that only air which has been deprived of its content of moisture in said air filter is allowed to enter into the air space of the oil tank.

A constructional example of the object of the invention is diagrammatically shown in section in the accompanying drawing.

In this drawing R denotes a tank filled with oil the space H of which is intended for taking up an electric high-tension switch or another electric apparatus, for instance a transformer, which has to work submerged in oil. Around the upper edge of the tank R an auxiliary tank N is provided. The latter is filled with oil or another substance adapted to absorb moisture. The tank R is closed by means of a stationary cover D which rests on the flange of an angle iron D' fixed to the casing, and the cover is secured in this position at the upper edge of the tank R by any means permitting the removal of the cover for inspection purposes. The cover D is provided with three annular rims or ribs E, F, G extending in a down-ward direction. The inner rib E projects into the tank R adjacent to the shell of the tank and is provided with a number of apertures L. The two outer ribs F and G are longer than the rib E and project deeply into the auxiliary tank N and thereby into the liquid with which this tank is filled. The lower portion of the two ribs F and G is provided with a number of apertures A in the manner of a sieve. When the cover D is placed in its proper position on the tank R the two ribs F and G do not extend to the bottom of the auxiliary tank N, but a space B is left between the lowermost edges of said ribs and said bottom. The outer edge of the cover D is bent in a down-ward direction and projects beyond the outer wall of the auxiliary tank. The latter is provided with an indicator P which indicates the level of the liquid in the auxiliary tank.

The air filter may also be provided with only one rib or with more than two rims.

The above described seal for the oil tank R operates as follows:

As soon as a lower pressure is generated from any reason inside the tank R i. e. in the air space between the oil and the cover, an equalization will take place inasmuch as the level M rises and the level Q falls, the level O will also fall slighty. Upon a further decrease in pressure inside the tank R the level M rises further and level Q falls down to the upper edge of the holes A, in which moment air bubbles pass through the filter substance and through the apertures A into the space between the ribs F and G until the levels Q and O are at the same elevation. Upon a continuation of this operation air is drawn from the space between the ribs F, G through the filter substance and through the apertures A in the rib G and enters the space above H. By the air passing the filter substance on its way from outside to the space above H in the tank in the direction of arrow I the air is deprived of its moisture which is absorbed by the filter substance. The circulation of air occurs slowly in dependence upon the variations of temperature of the whole apparatus. The moisture absorbed remains in the liquid of the auxiliary tank, if that liquid be oil, the moisture will sink to the bottom of said tank N. The air entering into the air space of the tank R is dry and cannot have any detrimental effects upon the apparatus immersed in the oil or on the oil itself. In case of a surplus pressure being generated in the air space inside the tank R the air can escape through the apertures L and A. Upon an eventual short circuit occurring in the working space H larger quantities of gas can escape by means of the intermediate space B between the ribs F and G and the bottom of the auxiliary tank N (in the direction of flow indicated by the arrow II).

Instead of a single air filter arranged around the tank R several air filters arranged in series might be provided. The auxiliary tank N might be subdivided along the circumference of the tank R into several individual tanks, whereby a partial renewal of the air filter liquid is made possible. Each of said individual tanks would then be fitted with a liquid level indicator provided with means for removing the condensed water. The renewal of the liquid in the air filter can be carried out during the working of the electric apparatus without any danger to life.

I claim:

1. An oil container and a stationary cover between which cover and the oil in the container is included an air space; in combination with an air filter arranged around the joint between said container and stationary cover, and an absorbent of moisture contained in said filter, said filter having means to compel the air passing into the container to pass through said absorbent and means to provide an emergency passage for a large volume of air from the interior of the container through the filter to the outside.

2. An oil container and a stationary cover between which cover and the oil in the container is included an air space; in combination with an air filter arranged around the upper edge of said container and including a water separating liquid, and means on the cover to cause the air entering said container to pass through said liquid to remove moisture from the air and means to provide an emergency passage for a large volume of air from the interior of the container through the filter to the outside.

3. An oil container for submerged electrical apparatus and a stationary cover between which cover and the oil in the container is included an air space; in combination with an auxiliary container arranged around the edge of said oil container, a liquid in said auxiliary container capable of removing moisture from air, a rim on said cover depending into said liquid and auxiliary container to some distance from the bottom thereof to provide an emergency exit for air from the interior of the container to the outside past the lower edges of said rim and having apertures therethrough normally below the level of said liquid to positively direct air through said liquid when entering said oil container.

4. An oil container for submerged electrical apparatus and a stationary cover between which cover and the oil in said container is included an air space; in combination with an auxiliary container arranged around the top of said oil container for the reception of a liquid capable of removing moisture from air, a plurality of rims on said cover depending into said auxiliary receptacle below the level of the liquid therein to some distance from the bottom thereof, to provide an emergency exit for air from the interior of the container to the outside past the lower edges of said rims and having perforations therethrough below the normal liquid level in said auxiliary container, whereby air is caused to pass through said liquid under different hydraulic heads.

In testimony that I claim the foregoing as my invention, I have signed my name.

ERNST HAUSER.